United States Patent [19]

Diggs

[11] 4,077,193
[45] Mar. 7, 1978

[54] FRUIT AND NUT HARVESTER

[76] Inventor: Richard E. Diggs, S. 12A Rd., P.O. Box 776, Carthage, Mo. 64836

[21] Appl. No.: 675,701

[22] Filed: Apr. 12, 1976

[51] Int. Cl.² .......................................... A01D 46/24
[52] U.S. Cl. ................................. 56/328 R; 56/329; 56/330
[58] Field of Search ................. 56/328 R, 329, 330, 56/10.3

[56] References Cited

U.S. PATENT DOCUMENTS

| | | | |
|---|---|---|---|
| 3,385,042 | 5/1968 | Christie et al. | 56/330 |
| 3,522,696 | 8/1970 | Miller et al. | 56/328 R |
| 3,596,446 | 8/1971 | Bryan | 56/10.3 |
| 3,760,574 | 9/1973 | Tassone | 56/330 |

Primary Examiner—Jay N. Eskovitz

[57] ABSTRACT

Apparatus and method are disclosed for efficient harvesting of fruits or nuts from trees. Picking tines extend radially from a vertically disposed drive shaft and move horizontally through the foliage of a fruit or nut bearing tree by rotation of the shaft. During rotation, the drive shaft is also reciprocated vertically for upward and downward movement of the tines in the foliage while they also move horizontally therein. Also, the rotational velocity of the shafts is varied rhythmically so that horizontal travel of the tines on upward movement becomes zero or else is much slower than during downward movement. By upward and downward movement of the tines, while also varying their horizontal travel rhythmically, the harvesting rate can be increased and the damage to tree foliage can be reduced.

14 Claims, 13 Drawing Figures

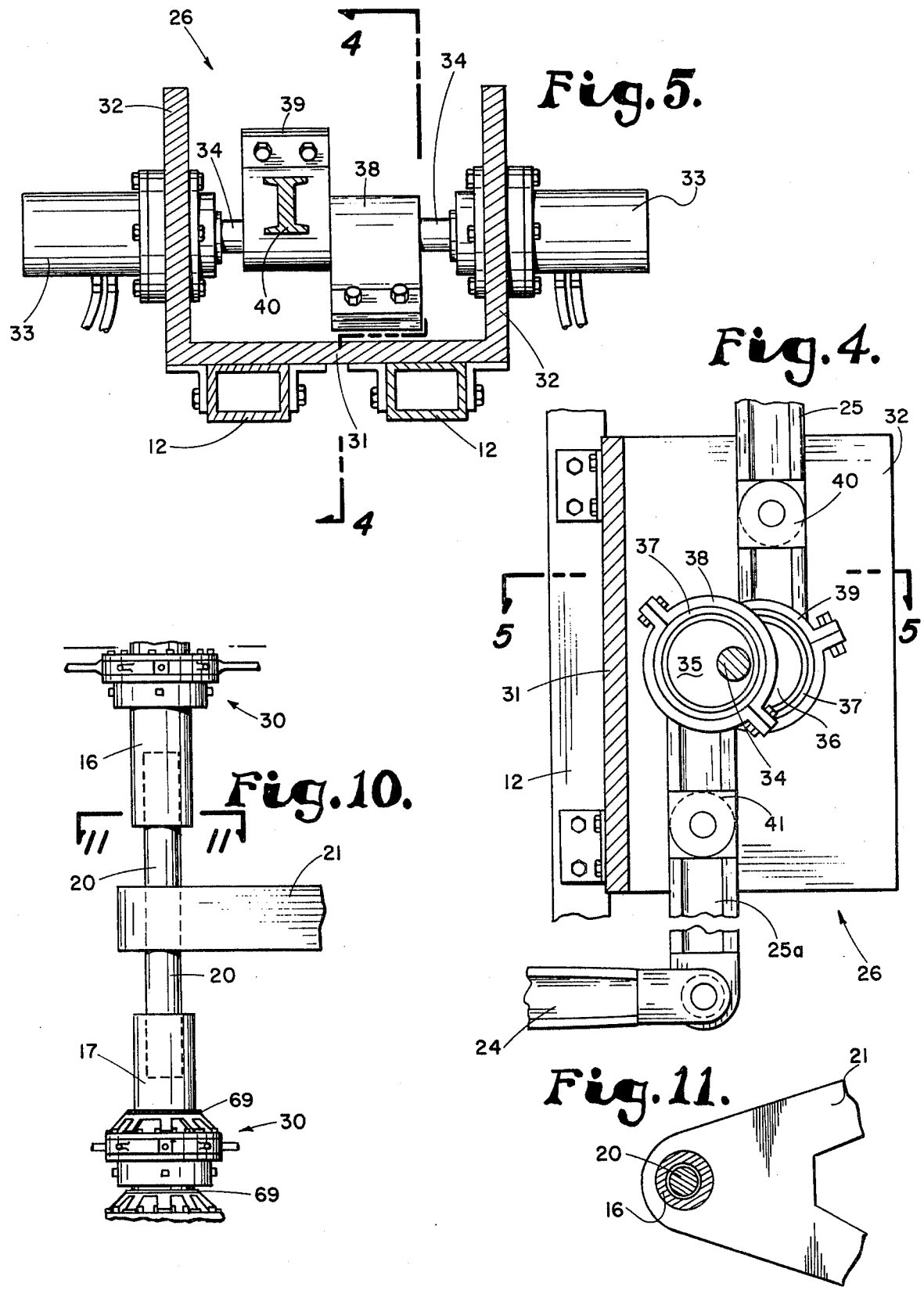

FRUIT AND NUT HARVESTER

BACKGROUND OF THE INVENTION

The present invention pertains to the harvesting of fruits or nuts, hereinafter sometimes referred to merely as "fruit." More particularly, the present invention pertains to the mechanical harvesting from trees or bushes of citrus fruits, various types of nut crops such as almonds, walnuts, pecans, and other types of fruits such as apples, plums, pears and the like which are to be gathered, processed and canned.

Considerable efforts have been directed toward development of a reliable and efficient harvester apparatus whereby the mechanical picking of fruit can be accomplished at low cost relative to hand-picking, without excessive damage being done to either the fruit being picked or the tree which bears it. Examples of such efforts to develop a practical harvester, and also the persistancy of the problems associated therewith, can be seen in U.S. Pat. Nos. 3,040,507; 3,129,551; 3,200,575; 3,425,202; 3,440,809; 3,485,024; 3,496,705; 3,522,696 and 3,561,205.

For various reasons, previous harvesters have not proven altogether practical and thus have not been readily accepted throughout the industry. They have, for instance, been rejected as too slow at the picking process, as leaving too much fruit on the trees, as being damaging to the foliage of the trees and/or to the fruit thereon, or as being mechanically unreliable.

Miller et al in U.S. Pat. No. 3,522,696 disclose a harvester for fruits or nuts which comprises tine means including a pair of rotary drive shafts colinearly arranged on a vertical axis, each of the shafts being independently movable thereon and having a plurality of horizontal tines secured to and extending radially outward therefrom. Reciprocating means are also provided for effecting opposite upward and downward linear reciprocatory movement of the drive shafts on the vertical axis so that the tines can be moved up and down while also being rotated through horizontal planes.

It should be noted, however, that the apparatus and method of Miller et al require that the horizontal movement of the picking tines relative to a tree be zero, so that neither the tree nor the fruit thereon realize any horizontal movement by the tines. In fact, horizontal rotation of the tines is in a direction opposite to that in which the harvester moves around a tree, thus negating any horizontal movement of the tines which would otherwise be brought to bear on tree foliage and the fruit thereon during movement of the harvester apparatus relative to a tree being picked. Consequently, a tree being picked by the apparatus of Miller et al realizes only upward and downward movement of the picking tines. The stated purpose of tine movement in this fashion is avoidance of tearing and damaging of the limbs and branches of the tree. It will be appreciated, however, that any movement of tree limbs and branches in order to shake off the fruit is limited only to such movement as can be effected by moving the picking tines up and down in the absence of any horizontal movement thereof relative to tree being picked.

Therefore, one object of the present invention is to provide for the harvesting of fruits or nuts whereby the aforesaid problems associated with previous harvesters are avoided.

A principle object of the invention is to provide mechanical harvesting of fruit or nuts wherein tree branches are lifted upward and are then allowed to fall freely so that separation of the fruit or nuts from the tree occurs when the branches snap quickly upward after being allowed to fall.

Still another object is to provide efficient mechanical harvesting of fruits or nuts whereby the picking and gathering thereof is faster and cheaper than picking and gathering by hand.

Still another object is to provide for mechanical harvesting of fruits or nuts whereby a high percentage thereof is more quickly removed from a tree and gathered so that time and cost of mechanical harvesting are minimized.

Yet another object is to provide reliable apparatus and process for the harvesting of fruit.

Even another object is to provide mechanical harvesting in conformity with the previously stated objects while also avoiding excessive damage to tree foliage and the fruit being harvested.

Other objects and advantages of the present invention will become apparent from the following description of exemplary embodiments and from the appended claims.

SUMMARY OF THE INVENTION

In accordance with the present invention, picking tines which extend radially from a vertically disposed drive shaft are caused to move horizontally through the foliage of a fruit-bearing tree by rotation of the drive shaft. The drive shaft is also reciprocated vertically for upward and downward movement of the tines within the tree foliage while they also travel horizontally therein. However, the rate at which the tines move horizontally is not uniform since the horizontal velocity at which the tines travel is varied rhythmically.

Accordingly, the rate at which the tines travel horizontally can be slowed or stopped when the tines are moved upward; and, as a consequence thereof, the tines are not twisted against the surface of tree limbs being raised upward. To further advantage, the downward linear velocity of the tines during the aforesaid downward movement thereof can be faster than the velocity at which raised branches fall back to the normal state of repose when released, thus providing a vigorous snapping action to the limb which effects separation of fruit therefrom.

Apparatus for harvesting fruits or nuts in accordance with the present invention can comprise tine means which includes a vertically disposed drive shaft having a plurality of horizontal picking tines secured to and extending radially outward therefrom, a vehicle means for transporting the tine means horizontally, a reciprocating means for reciprocating the drive shaft upwards and downwards, a drive means for rotating the drive shaft, and a velocity varying means for varying the rotational velocity of the drive shaft rhythmically during operation of the harvester.

To advantage, the tine means of the harvester can comprise a pair of rotary drive shafts colinearly arranged on a vertical axis, each of the drive shafts having a plurality of horizontal tines secured to and extending radially outward therefrom, with each of the drive shafts being rotatable on the vertical axis and independently movable back and forth thereon. In addition, the reciprocating means can be adapted for opposite upward and downward reciprocatory movement of the two drive shafts, and the velocity varying means can be adapted for varying the rotation of both shafts rhythmically as they move up and down in opposite directions.

BRIEF DESCRIPTION OF THE DRAWINGS

FIG. 4 is a side view of a drive unit whereby the twin rotating drive shafts of the carousel are reciprocated upwards and downwards in opposite directions.

FIG. 5 is a top view of the drive unit along the line 5—5 of FIG. 4.

FIG. 10 illustrates one manner in which the inner ends of the twin drive shafts of the carousel can be stabilized on the support frame shown in FIG. 2.

FIG. 11 is a view along the line 11—11 of FIG. 10.

DESCRIPTION OF PREFERRED AND ALTERNATIVE EMBODIMENTS

Figure 1:
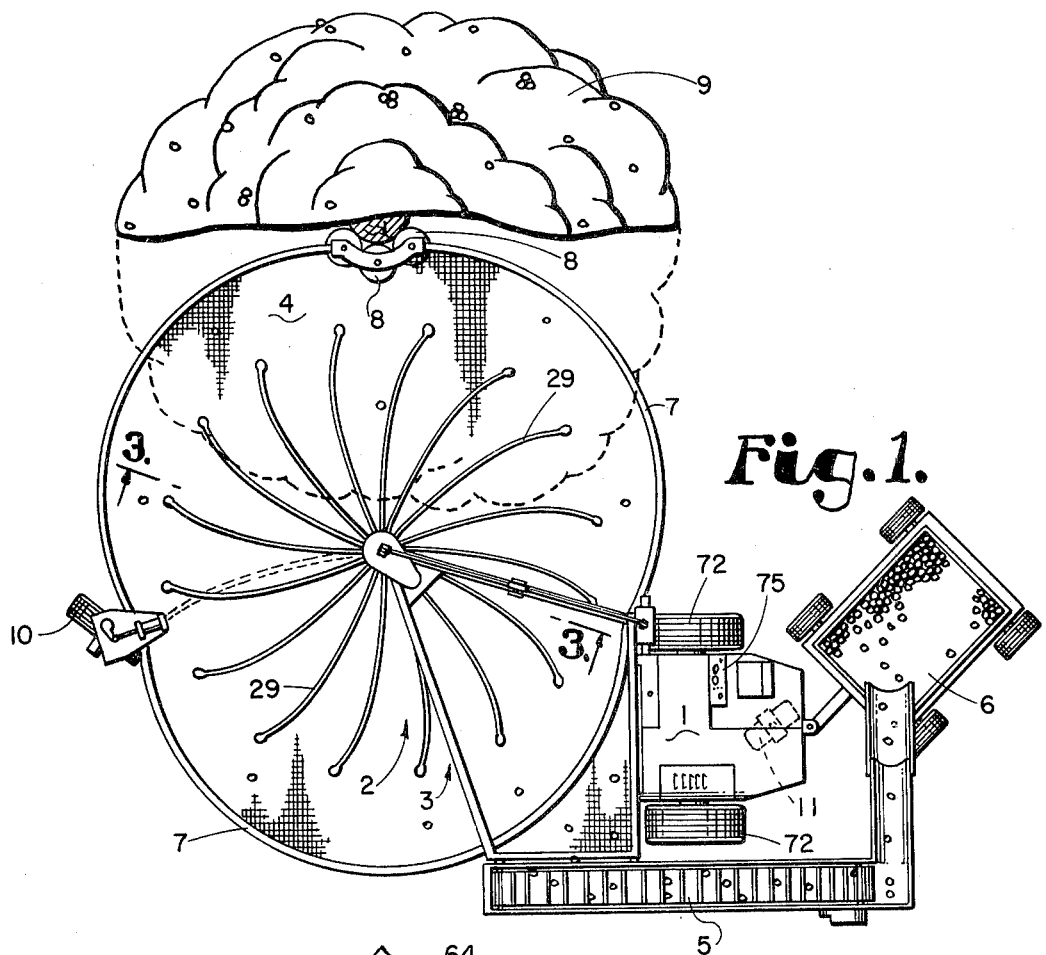
FIG. 1 is a top view, looking down, of the harvester of the present invention.

In FIG. 1, the harvester comprises a motorized vehicle, represented at 1, a picking tine carousel generally represented at 2, a rigid carousel support frame 3 which is attached to the vehicle, a net 4 for catching fruit or nuts shaken from a tree, and a conveyor 5 for transporting the fruit or nuts to a trailer 6 which is towed by the motorized vehicle. The net 4 is attached at its outer edges to a rigid ring member 7 that is attached to the lower side of the support frame and is provided with rollers 8 whereby the ring member can be urged gently against the trunk of a tree 9 being picked, without damage to the trunk, while the harvester is steered in a circular path around the tree. Steering of the harvester can be accomplished by means of a steerable front wheel 10, and it will be understood that more than one steerable front wheel can be employed. In addition, an auxilliary rear steering wheel 11 can be employed should such be preferred.

Figure 2:
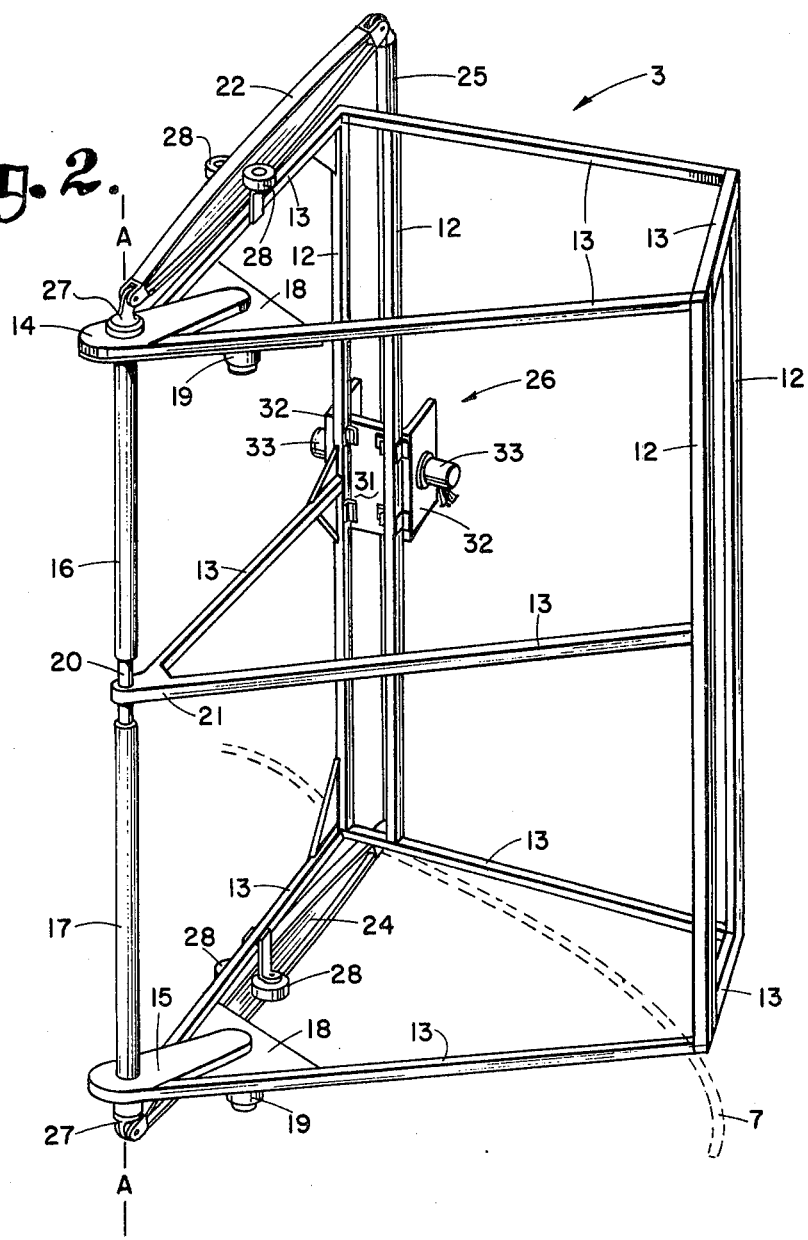
FIG. 2 is an isometric illustration of a support frame whereby the rotating, reciprocating picking tine carousel and its drive means are stably mounted on the harvester.

In FIG. 2, the carousel support frame 3 comprises rigid vertically extending members 12 in welded connection with rigid horizontal members 13. Rotary drive means 14 and 15 for the dual drive shafts 16 and 17 of the picking tine carousel are mounted on rigid triangular plates 18 which are welded to the horizontal support frame members 13. Motors for the rotary drive means are represented at 19.

Also visible in FIG. 2 are portions of the reciprocatory drive means for reciprocating drive shafts 16 and 17 upwards and downwards on the vertical axis A—A of the shafts. The inner ends of the drive shafts 16 and 17 fit slidably over a stabilizing spindle 20 that is rigidly attached to tang 21 of the support frame 3. Rocker arms 22 and 24 are pivotally attached at their outer ends to connecting rods 25 which lead to the reciprocatory drive means, which is generally represented at 26, and which is shown in greater detail in FIGS. 4 and 5. The inner ends of the rocker arms 22 and 24 are attached to connecting joints 27 on the outer ends of the drive shafts 16 and 17, and whereby the shafts can be pushed and pulled at their outer ends, while rotating, by pivoting of the rocker arms at the roller bearings 28 in rolling contact with the arms and attached to support frame members 13. Further details on the reciprocatory drive means is found in FIGS. 3, 4 and 5. A side view of the apparatus of FIG. 2 is shown in FIG. 3, which additionally shows the picking tines 29 attached to the drive shafts 16 and 17 by means of slip clutches 30.

Figure 3:
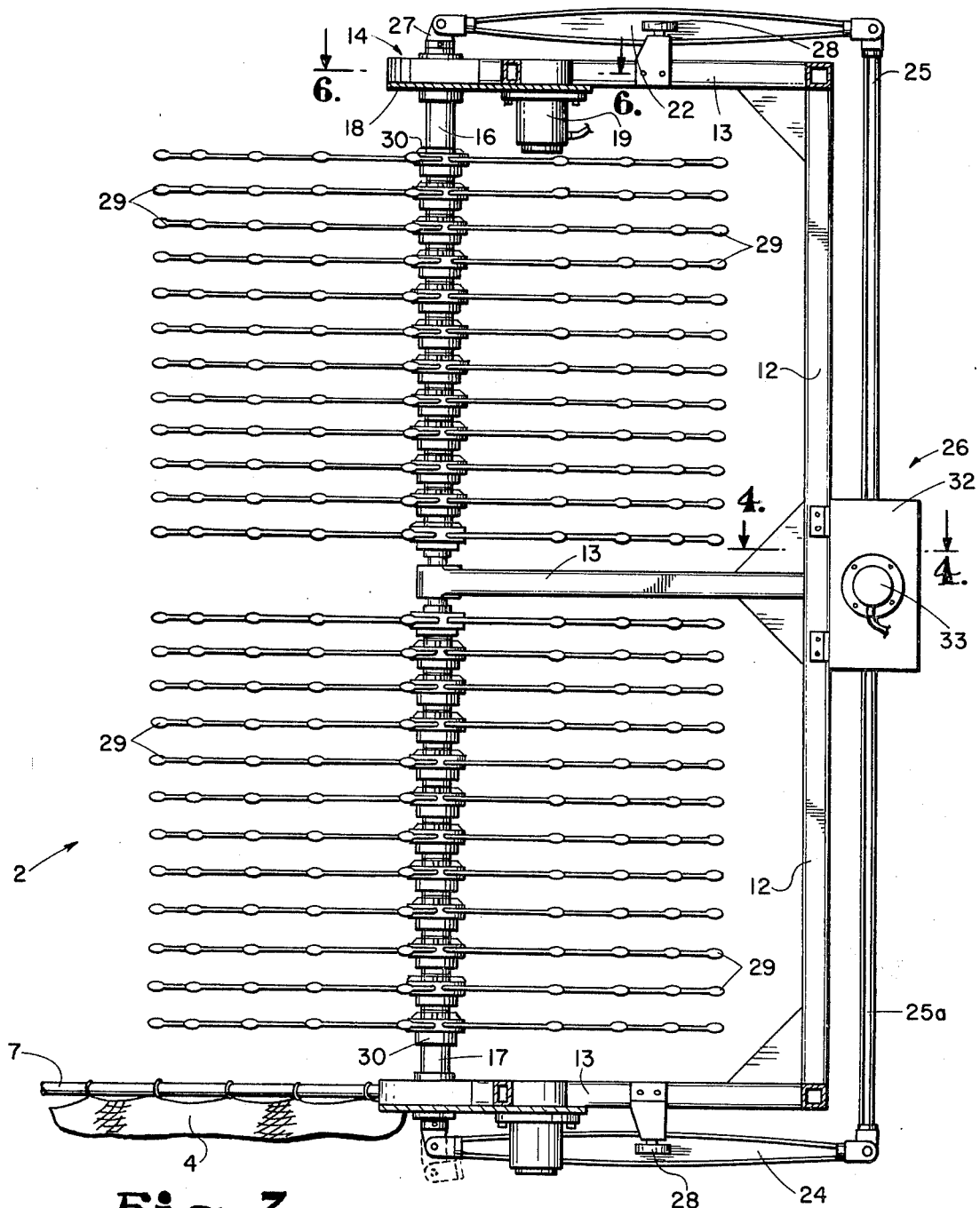
FIG. 3 is a side view of the picking tine carousel along the line 3—3 of FIG. 1.

In FIGS. 3, 4 and 5, the reciprocatory drive means 26 comprises a mounting frame plate 31 attached to frame members 12 and two motor mounting plates 32 attached to the edges of the frame mounting plate and which extend perpendicularly from the outer edges thereof in spaced-apart relationship. Twin drive motors 33 are attached to a common drive shaft 34 having circular crank eccentrics 35 and 36 mounted thereon, both eccentrics being the same diameter and with their maximum points of eccentricity being 180 degrees apart. Sealed roller bearings 37 are mounted on the eccentrics and each bearing is provided with a bearing cap 38 and 39 having respective attachment members 40 and 41 rigidly affixed thereto for pivotal connection of the upper and lower connecting rods 25 and 25a. Arranged accordingly, rotation of shaft 34 by motors 33 causes rotation of eccentrics 35 and 36 within bearing caps 38 and 39 whereby attachment members 40 and 41 are caused to reciprocate up and down for movement of the respectively attached connecting rods 25 and 25a in order to effect pivoting of upper and lower rocker arms 22 and 24.

Using the reciprocatory drive arrangement shown in FIGS. 4 and 5, the outer ends of both the upper and lower rocker arm are caused to move inward toward the drive unit 26 at the same time and then outward therefrom at the same time by continuous turning of shaft 34 with motors 33. Therefore, the drive shafts 16 and 17 are caused to reciprocate in opposite directions along axis A—A (FIG. 2) in order to prevent considerable stress and vibration which could be caused by simultaneously moving both shafts 16 and 17 upward and then abruptly downward. More specifically, opposite reciprocatory motion of the shafts along axis A—A tends to prevent an oscillatory momentum shift of the drive shafts 16 and 17 and attached tines 29 as might result in violent up and down vibration of the carousel to the extent that serious damage occurs.

Figure 6:
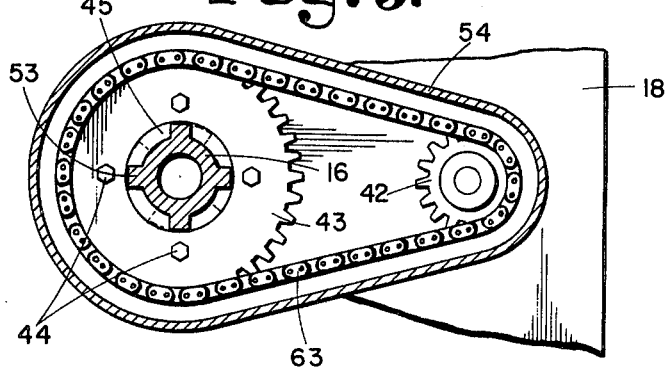
FIG. 6 is an end view of a drive means and rotational velocity controlling means for the drive shafts of the carousel.
Figure 7:
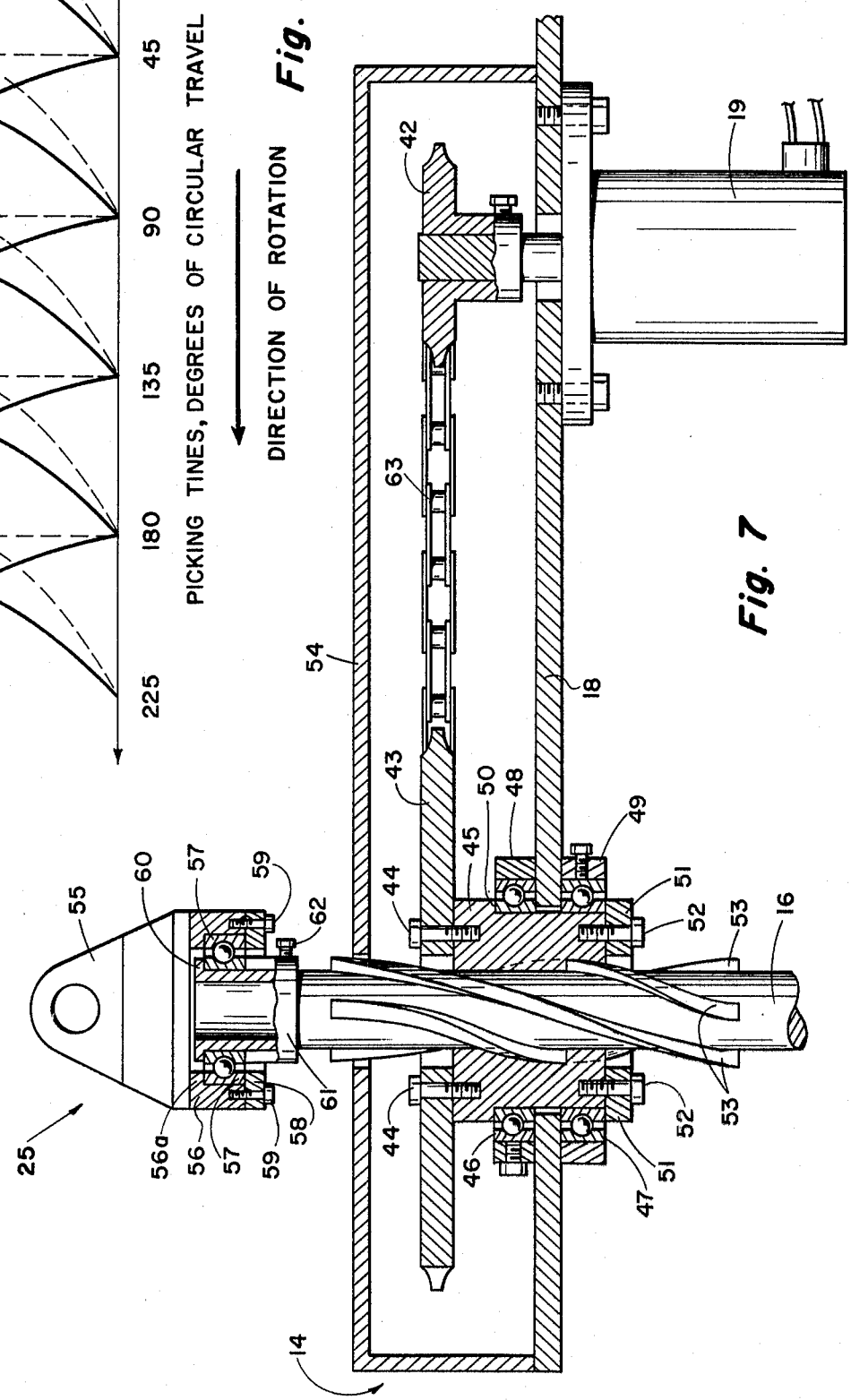
FIG. 7 is a side view, partly in section, of a drive means and a rotational velocity controlling means of the carousel.

With reference to FIGS. 6 and 7, the drive means for rotating drive shafts 16 and 17, and also the means for rhythmically varying the rotating velocity of the drive shafts, will be described. A variable speed drive motor 19 is attached to plate 18 on the support frame. The shaft of the motor has a chain sprocket 42 attached thereto for driving a second sprocket 43 attached by means of bolts 44 to a bushing 45. The bushing is rotatable within ball bearings 46 and 47, the bearing retained by upper and lower bearing keepers 48 and 49 attached to the top and bottom, respectively, of plate 18. Downward movement of the bushing is prevented by means of a shoulder 50 thereon which rests against the inner ball race of bearing 46. Upward movement of the bushing is prevented by means of a thrust arresting ring 51 mounted to the bottom of the bushing with bolts 52, and which abuts the inner race of bearing 47. Four helical splines 53 are attached to shaft 16 toward the outer end thereof and fit into matching helical grooves in the bushing 45. A cover for the drive unit is represented at 54.

Referring further to FIG. 7, a rocker arm connecting joint 27 is attached to the outer end of shaft 16 and comprises an upwardly extending pivotal connecting member 55 having a bearing cup 56 into which the outer race of a ball bearing 57 is inserted. The upper edge of the outer race of the bearing 57 abuts a shoulder 56a on the bearing cup whereas the lower edge of the outer race of the bearing rests against a thrust arresting ring 58 which is secured to cup 56 by means of screws 59. The bearing cup, which resides below the pivotal connecting member 55 of joint 27 is an integral portion of the connecting member. Drive shaft 16 extends through the central opening of the bearing 57 and a shoulder 60 on the outer end of the drive shaft abuts the upper edge of the inner race of the bearing 57, whereas the lower edge of the inner race abuts a stop ring 61 mounted on shaft 16. The stop ring 61 is secured to the shaft 16 by means of a lock bolt 62. Thus arranged, the connecting joint 27 remains non-rotational during turning of the drive shaft therein and during reciprocation of the drive shaft by moving the connecting joint up and down with the rocker arms attached thereto.

Using the apparatus combination shown in FIGS. 6 and 7, the drive motor is run at a speed whereby sprocket 43 is turned at a desired rpm by means of chain 63. Accordingly, drive shaft 16 would turn at the same rpm as sprocket 43 were the shaft not reciprocated up and down by means of the rocker arm pivotally attached to the connecting joint 27. When, however, the shaft 16 is reciprocated up and down, it is caused to turn by movement of the helical splines 53 as they track within corresponding keyways in bushing 45. When the shaft is caused to rotate by the splines in the same direction that it is already being turned by sprocket 43, the rpm of the shaft is caused to increase so that it turns faster than the sprocket. On the otherhand, when the shaft is caused to rotate in the opposite direction that it is being turned by sprocket 43, the rpm of the shaft is caused to decrease relative to the rpm of the sprocket.

With clockwise rotation of sprocket 43 in the apparatus of FIGS. 6 and 7, reciprocation of shaft 16 upward effects a counter-clockwise movement of the shaft by means of splines 53, whereas a counterclockwise movement of the shaft is effected upon downward reciprocation thereof. It will be appreciated that by properly matching the pitch of the helical splines 53 with the rpm of sprocket 43 that actual rotation of shaft 16 on upward reciprocation thereof can be caused to become zero, i.e. the counterclockwise rotation of the shaft by means of the shaft splines 53 will be at the same rate as the shaft is being turned clockwise by the sprocket 43, and thus no rotation of the shaft occurs. Contrariwise, the rpm of the shaft on downward reciprocation thereof will be twice that of sprocket 43. Accordingly, rotation of shaft 16 and horizontal movement of the tines 29 attached thereto can be halted upon upward reciprocatory movement of the shaft on axis A—A, with resumption of shaft rotation and horizontal movement of the tines upon downward reciprocatory movement of the shaft.

It will be understood that the harvester of the present invention need have only one drive shaft with attached tines, but two shafts, as shown in the drawings, is preferred. When a second drive shaft, e.g. 17, is also employed, the outer end thereof can also be equipped with a drive unit and helical splines as shown in FIGS. 3, 6 and 7, and the helical splines on shaft 17 should be arranged so that the shaft speed is slowed, relative to the drive sprocket rpm, when the shaft and its attached tines are reciprocated upward, i.e. the horizontal movement of all the tines 29 is stopped or at least greatly slowed upon upward reciprocation of both drive shafts, and even though the two shafts reciprocate oppositely. In addition, each shaft drive unit can be provided with a variable speed drive unit so that one of the shafts with the attached tines can be turned faster than the other shaft.

Figure 13:
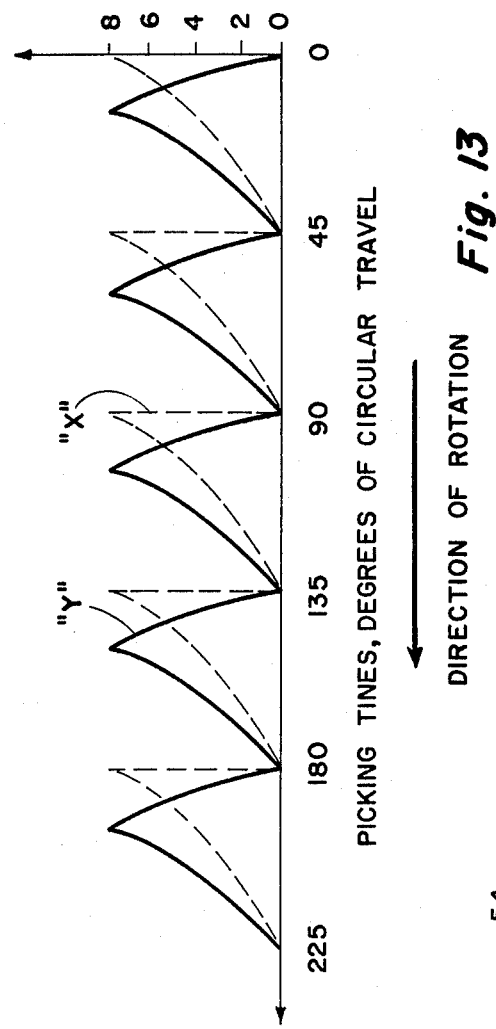
FIG. 13 is a graphic representation of horizontal and vertical up and down reciprocatory movement of the carousel during operation of the harvester.

FIG. 13 is a graphic representation of rhythmically varied drive shaft rotation, and hence rhythmically varied horizontal movement of the picking tines, in accordance with the present invention. As shown in FIG. 13, the picking tines are raised and lowered through a total distance of 8 inches during up and down reciprocation of the drive shafts, with a full reciprocatory cycle being completed during each 45 degrees of drive shaft rotation. An ideal rhythmical variation of horizontal movement of the tines is illustrated by dotted line "X," whereby the degrees of circular travel of the tines is zero during upward reciprocatory movement thereof. Accordingly, there is no horizontal movement of the tines on the limbs during upward movement. However, in order to minimize damage to tree limbs from horizontal movement of the tines during lifting of the limbs, it is not essential that horizontal movement of the tines always be zero during the lifting since it has been observed that horizontal movement of as much as 15° rotation can sometimes be tolerated. A rhythmical 15° horizontal movement of the tines is illustrated by line "Y" in FIG. 13. Larger or smaller rhythmical intervals of horizontal movement can also be used where preferrable and practical.

Figure 8:
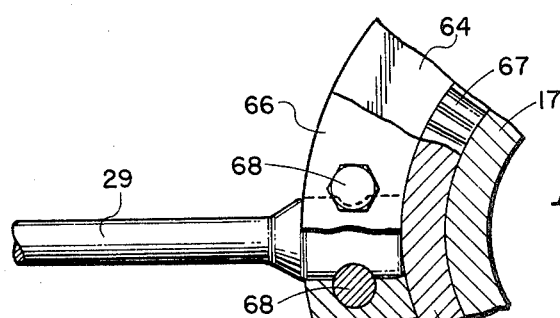
FIG. 8 is a fragmented top view, partly in section, of a slip clutch means for the picking tines, and illustrating one manner in which the tines can be attached to the slip clutch.
Figure 9:
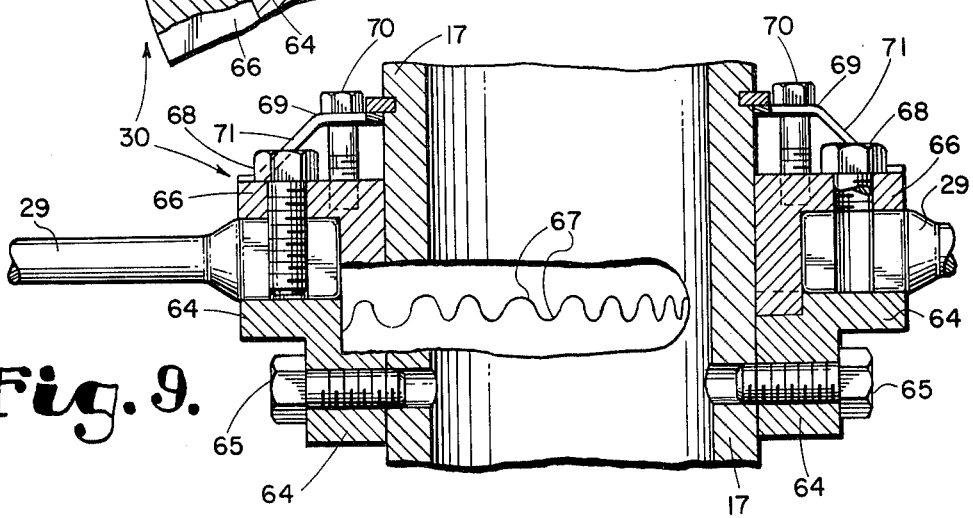
FIG. 9 is a side view, mostly in section of the same slip clutch means that is illustrated in FIG. 8.

FIGS. 8 and 9 illustrate one form of slip clutch means for attaching the picking tines 29 to the drive shafts whereby rotational (horizontal movement) of the tines is stopped before resistance to rotation of the tines, as by firm contact with rather large tree limbs, is sufficient to cause bending of the tines. As shown in FIGS. 8 and 9, the tines 29 are attached to a slip clutch 30 which is mounted on drive shaft 17. From FIG. 3 it can be seen that both of the drive shafts 16 and 17 have a plurality of such slip clutches, with attached tines, mounted thereon. Each slip clutch comprises a stationary ring 64 coaxially mounted on rotary drive shaft 17 and affixed thereto with bolts 65, and a slip ring 66 coaxially mounted on shaft 17 and which slippably engages the stationary ring 64 by means of matching, intermeshing, radially extending grooves 67 in the abutting inner faces of both rings 64 and 66. The inner ends of the tines fit into sockets therefor in the slip ring and are held in place by bolts 68, the tines having indentions on their sides for the bolts whereby the tines are locked in place when the bolts are tightened, and which can be quickly removed and replaced when the bolts are removed.

A ring-shaped clip spring 69 urges the slip ring 66 downwardly against the stationary ring 64, and the pressure at which the slip ring is brought to bear on the stationary ring can be adjusted by turning bolts 70 in order to vary the pressure at which the radially extending clips 71 of the spring urge the slip ring downward. Accordingly, the pressure can be regulated so that the slip ring slips over the stationary ring and thus turns on drive shaft 17 when rotary torque exerted on the slip ring exceeds a preestablished value upon obstructing horizontal movement of the tines attached thereto during rotation of the drive shaft. More specifically, the slip ring is adjusted to slip, by adjusting the compression exerted thereon by spring 69, to prevent bending of the tines 29 when their horizontal movement is obstructed by something which they cannot displace in order to continue moving horizontally. As the harvester continues traveling around a tree, stalled tines move away from obstructing branches so that their rotation recommences and continues until another obstruction again causes the clutch to slip.

As shown in FIG. 1, the picking tines 29 of the carousel can be curved in a horizontal direction, and it will be pointed out that the curving of the outer ends of the tines can be either in the direction that the drive shafts of the carousel are turned or in the opposite direction. When the curving is in the same direction that the shafts are turned, the outer ends of the tines can be provided with rounded outer ends, preferrably knobbed ends as shown, in order to prevent the tines stabbing larger limbs of a tree being picked. One purpose of curving the tines as shown is to facilitate their passage beneath limbs more transversally than parallel, hence minimizing the surface area of the contact between tree branches and tines during operation of the harvester, thus further minimizing damage to the branches and facilitating rapid clearance of the tines from the branches during downward movement of the tines.

When picking fruit or nuts the harvester is driven forward by means of powered drive wheels 72 on the vehicle 1, and is steered in a circular path around a tree being picked using steering wheel 10 and/or steering wheel 11. At the same time, the carousel is rotated, but the rotational velocity of the drive shafts is varied rhythmically during horizontal movement of the picking tines through the foliage of the tree 9 while the tines are also moved up and down therein by reciprocation of the carousel drive shafts as previously described. The sought-after effect is little or no horizontal movement of the picking tines in the foliage as branches are lifted upward, and a rapid downward movement of the tines, after lifting of the branches, so that the tines fall and move away from the branches faster than they can return by free fall toward a natural state of repose upon separation from the tines. In such fashion, the branches are lifted and then allowed to fall freely. Once they have fallen they then recoil sharply back upward. As a branch recoils upward after falling, the fruit or nuts attached thereto attempt to continue falling so that the momentum of the branch and the fruit are in opposite directions, thus breaking the attachment between the two and thereby separating the fruit from the branch so that it falls from the tree and into net 4.

By driving the harvester in a circular path around a tree being picked, a high percentage, e.g. 90+%, of the fruit on the tree can be removed during one pass by the harvester. This provides faster and thus less expensive harvesting in comparison to previous harvesters which require more than one pass to pick a tree, or else repeated backward-forward manuvers to travel around a tree being picked.

The speed at which the tines should be rotated and reciprocated upward and downward is subject to variation depending upon the type of fruit or nuts being picked, the length of the tines, tine spacing, etc., but in any event the proper rotating and reciprocating rate can be arrived at by use of variable speed motors on the rotating and reciprocating drive units. In similar fashion, the pitch of the helical splines on the drive shafts can be varied to provide various rhythmic variations in drive shaft rotation, and the distance through which the drive shaft and the attached tines reciprocate can be altered by changing the diameter of the eccentrics on the drive shaft 34 of the reciprocatory drive unit 26.

Figure 12:
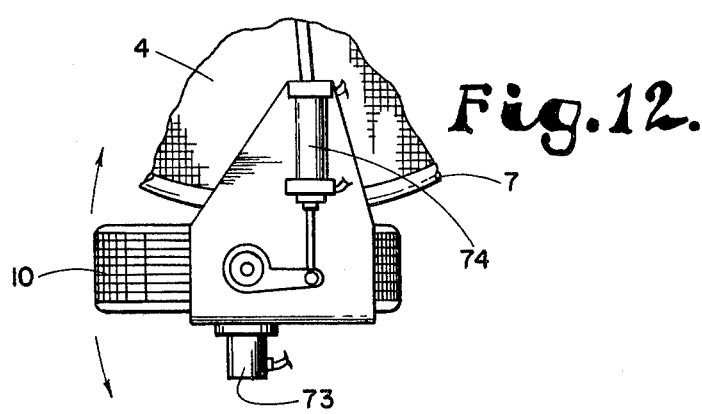
FIG. 12 is a top view, looking down, of a front steering wheel on the harvester shown in FIG. 1.

FIGS. 1 and 12 depict one embodiment of the invention whereby the present harvester can be driven and steered. In FIG. 12, the front wheel 10 is powered by means of a motor 73 and is steerable by means of a double acting hydraulic cylinder 74. Hydraulic fluid supply to cylinder 74, to effect steerable turning of wheel 10, can be accomplished at the control panel 75 of vehicle 1. Other means can be employed for steerable turning of wheel 10, e.g. conventional mechanical steering means can be used. Preferably, the drive wheels 72 can be driven with independent motors, and means can be provided whereby the speed of each wheel can be independently varied while applying vehicle-moving power to both wheels. Accordingly, the ability of the vehicle to maintain traction in sand or slippery soil is greatly improved while also improving the ability to maintain steered control of the harvester when picking a tree.

Although the present invention has been described with reference to specific apparatus, combinations thereof, method, conditions, and the like, it will nonetheless be understood that even other embodiments will become apparent which fall within the spirit and scope of the invention defined in the following claims.

What is claimed and desired to secure by Letters Patent is:

1. Harvesting apparatus for removing fruits, nuts, or the like from a tree or bush, comprising, in combination:
   a. tine means including a vertically disposed rotary drive shaft having a plurality of horizontal picking tines secured to and extending radially outward therefrom,
   b. vehicle means for transporting the tine means horizontally,
   c. reciprocating means for reciprocating the drive shaft upwards and downwards,
   d. drive means for rotating the drive shaft,
   e. velocity-varying means for varying the rotational velocity of the drive shaft rythmically during operation of the harvester; and wherein said drive shaft includes a pair of rotary drive shafts colinearly arranged on a vertical axis, each of said shafts having said tines secured thereto, each of said drive shafts being rotatable on said axis and being independently movable back and forth thereon, and wherein said reciprocating means is adapted for opposite upward and downward reciprocatory movement of the two drive shafts on said axis, and said velocity-varying means is adapted for varying the rotation of both shafts rythmically as they move up and down in opposite directions;
   f. said drive shafts having inner and outer ends and said reciprocating means comprising connecting means attached to the outer end of each shaft for urging the shafts to reciprocate by exerting force in opposite directions on the outer ends thereof; and g. the outer ends of each of said drive shafts extending through a bushing therefor which is stabilized against upward or downward movement in relation to the drive shaft, said bushing having a helical keyway in the inner wall thereof and the outer end of the drive shaft having a helical spline thereon which fits into the keyway.

2. Apparatus as in claim 1 wherein the rotational velocity of said shaft is slowed during upward reciprocatory movement thereof.

3. Apparatus as in claim 2 wherein rotation of said shaft during said upward movement is within the range of about 0° to 15°.

4. Apparatus as in claim 3 wherein said horizontal tines engage tree branches and raise said branches upward during said upward movement of the shaft, and wherein the downward linear velocity of said shaft during said downward movement is faster than the velocity at which said raised branches will fall back to their natural state of repose when released by the tines.

5. Apparatus as in claim 1 and further comprising steering means whereby said vehicle is steerable in a circular path.

6. Apparatus as in claim 1 wherein said tines are horizontally curved.

7. Apparatus as in claim 6 wherein said tines are horizontally curved in the direction of rotation that said drive shaft is turned.

8. Apparatus as in claim 7 wherein said tines have rounded outer ends.

9. Apparatus as in claim 1 and further comprising slip clutch means for stopping rotation of said horizontal tines before resistance to the rotation thereof is enough to bend the tines, each of said shafts having a said clutch means mounted thereon and wherein said tines are attached to said clutch.

10. Apparatus as in claim 9 wherein said clutch means comprises a stationary ring coaxially mounted on the drive shaft and secured thereto, a slip ring coaxially mounted on the drive shaft and which slipably engages the stationary ring, the slip ring being adapted to slip and thus turn on the stationary ring when rotary torque exerted on the slip ring exceed a preestablished value, said tines being attached to said slip ring.

11. Apparatus as in claim 1 wherein each of the drive shafts is provided with one of said drive means and further comprising speed control means for regulating the rotational speed of each drive shaft independently of the other.

12. In a process for harvesting fruits, nuts or the like from trees by passage of horizontal tines through the foliage of a tree, said tines extending radially from a vertically disposed drive shaft and being passed horizontally through said foliage by rotating said shaft, and wherein the drive shaft is reciprocated vertically for upward and downward movement of said tines within said foliage while the tines also travel horizontally therein, the improvement for increasing the rate of harvesting while reducing damage to the tree foliage which comprises continuously varying rhythmically the rate at which said tines travel horizontally, and wherein said rate at which the tines travel horizontally is slowed when the tines move upward.

13. A process as in claim 12 wherein the rotational travel of said drive shaft during upward movement of said tines is within the range of about 0° to 15°.

14. Harvesting apparatus for removing fruits, nuts, or the like from a tree or bush, comprising in combination:
   a. tine means including a vertically disposed rotary drive shaft having a plurality of horizontally disposed picking tines secured thereto and extending radially outwardly therefrom;
   b. vehicle means for transporting said tine means;
   c. reciprocating means for effecting upwardly and downwardly directed movement of said drive shaft;
   d. drive means for rotating said drive shaft; and
   e. automatic velocity varying means automatically rhythmically varying the speed of rotation of said drive shaft in conjunction with said reciprocating means causing said tines to have greater horizontal movement as said drive shaft is reciprocated downwardly and less horizontal movement as said drive shaft is directed upwardly, including said drive shaft having upper and lower ends with said reciprocating means attached thereto and further including helical splines extending through a bushing stabilized against upwardly and downwardly directed movement thereof, said bushing having a coordinating helical keyway therein, said drive means rotating said bushing for driving said drive shaft.

* * * * *